3,606,676
SILICATE BONDING OF MAGNETIC CORES
Dale M. Kohler, Middletown, Ohio, assignor to Armco
Steel Corporation, Middletown, Ohio
Filed Mar. 21, 1969, Ser. No. 809,268
Int. Cl. H01f 7/06
U.S. Cl. 29—605                                    6 Claims

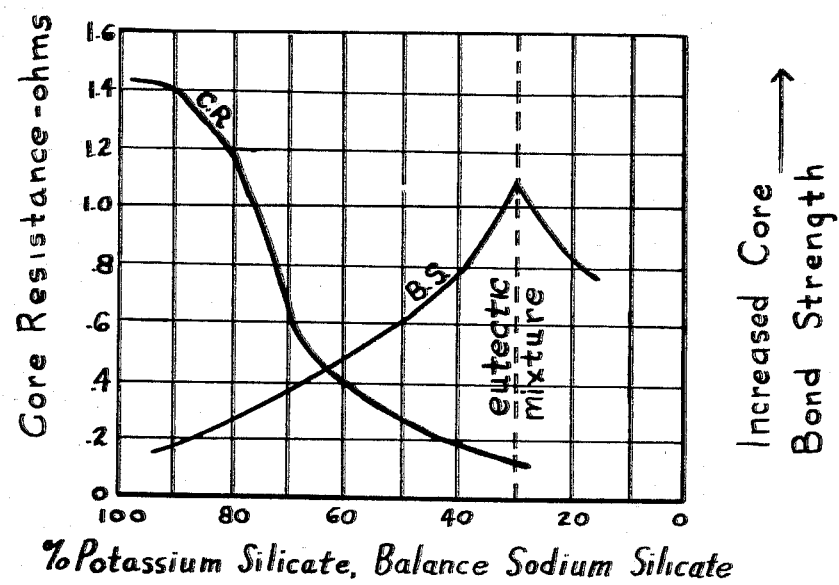
Fig 1 — %Potassium Silicate, Balance Sodium Silicate
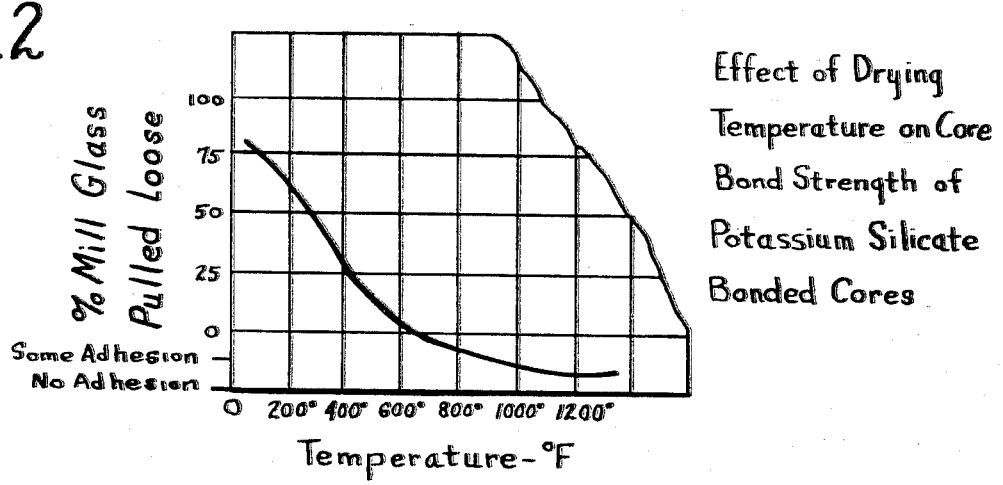
Fig 2 — Effect of Drying Temperature on Core Bond Strength of Potassium Silicate Bonded Cores
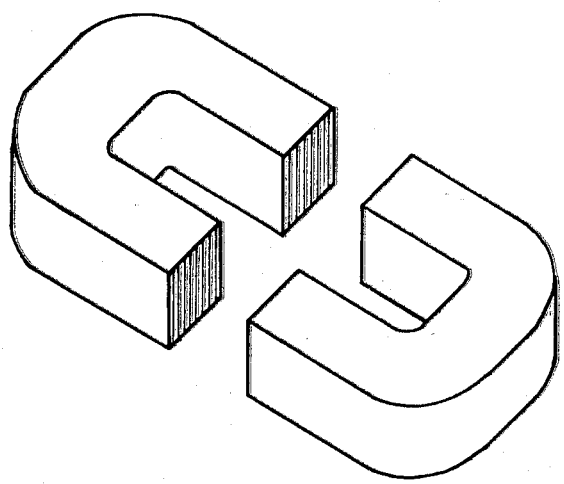
Fig. 3
INVENTOR/S
Dale M Kohler United States Patent Office 3,606,676
Patented Sept. 21, 1971

ABSTRACT OF THE DISCLOSURE

A method of bonding the contiguous windings of a wound core of magnetic strip material by the steps which include coating said strip with a silicate solution and drying in situ prior to or after winding into said core. During a subsequent stress relief anneal, the silicate fuses the core together thereby effecting the bond.

BACKGROUND OF THE INVENTION

(1) Field of invention

This invention relates to an economical procedure for bonding wound cores of magnetic material by the use of water soluble silicates applied to the surfaces of said magnetic material. When the core is subjected to a stress relief anneal, the silicate glass effects a bond in the core such that the core can be cut and lapped without splits. Specifically, the invention is directed to the method of bonding the wound cores by the use of a silicate glass selected from the group of potassium silicate and combinations of potassium silicate and sodium silicate.

The term "magnetic material" as used above and in the description to follow is intended to include the class of materials known as "oriented and non-oriented silicon steels," and other ferrous alloys known for their magnetic properties. However, since the bulk of wound magnetic cores are manufactured from silicon steels, for convenience the description will be so limited. Nevertheless, this should not be read as a limitation on the invention.

In the manufacturing of electromagnetic devices utilizing wound cores of magnetic strip material, a typical example being a transformer, it is essential that the wound core which is cut in half transverse to the strip windings and lapped or ground on the cut faces, must not evidence splits or separations in the windings of the core.

One solution proposed by the prior art is the use of an epoxy cement or other resin impregnated between the winding while the whole core is subjected to a vacuum. While this method provides a sound bond for the core, it requires an additional operating step. A typical curing temperature for the epoxy cements is on the order of several hundred degrees F. Therefore, since the wound core must be given a stress relief anneal at a temperature of about 1450° F. and this temperature is too extreme for the epoxy cement, it is necessary to conduct the bonding of the cut core after the stress relief anneal as a separate operation.

Another problem in the use of organic binders is that the resin shrinks when it is cured. This shrinking action imparts a compressive force on the magnetic material which results in poor magnetic performance, principally causing higher core losses in the material.

In the present invention it was discovered that the preceding problems could be overcome or eliminated by bonding the wound cores with a silicate glass during the stress relief anneal. Since the coefficient of expansion of glass is less than that of the magnetic material, the fused glass leaves the material in tension, thereby resulting in improved magnetic properties.

(2) Description of prior art

It has been known for many years that the soluble silicates, particularly sodium silicate, can be used to bind materials together. The paperboard industry makes extensive use of silicates for bonding. In the metal industry soluble silicates are impregntaed in porous castings to seal leaks. Also, welding rods are coated with silicates because of their good bond and fluxing action.

In co-pending application, Ser. No. 694,882, the present inventor described the use of potassium silicate as a coating over mill glass or a phosphate coating, or both, on a silicon steel in order to improve resistivity, magnetostriction and refractoriness. In order to achieve these desired characteristics, the silicate coating is fired at temperatures exceeding 1000° F.

Some early U.S. patents teach the use of silicates in the processing of metal sheets. For example, U.S. Pat. No. 1,951,039 teaches the application of a mixture of lime, iron oxide, and waterglass in water to electrical sheets to form an insulative enamel coating. The water glass or soluble sodium silicate causes the enamel to adhere more tightly to the sheets before they are heated.

A second U.S. Pat. No. 1,946,146, discloses an insulative coating for metal sheets comprising sodium silicate and chromic acid adapted to precipitate chromium silicate upon exposure to heat. Further, the use of a silicate binder to cement particles of a refractory material to magnetic sheet material is taught in U.S. Pat. No. 1,924,311. In this latter patent, while sodium silicate is preferred, potassium, calcium or magnesium silicate may also be used.

Finally, from U.S. Pat. No. 3,214,302 it is known to form first an aqueous waterglass coating, fix the coating under heat, and then apply a phosphate or chromium-containing coating. However, despite the efforts of the prior art as reflected in the patents above, no one recognized the critical features of the invention described herein.

SUMMARY OF THE INVENTION

According to the preferred embodiment of this invention, a strip of magnetic material, such as oriented silicon steel, is provided with a coating of silicate glass. The silicate coating is selected from the group of materials including potassium silicate and combinations of potassium silicate and sodium silicate. The coating operation may be effected by passing said strip through an aqueous solution of the preselected glass coating. The coated stock is then subjected to a drying operation at a temperature up to about 800° F. However, as will be explained in more detail hereinafter, there is a direct relationship between the core bond strength and the drying temperature. Therefore, it is preferable to limit the drying to a maximum temperature of about 300° F. With the solution dried in situ, the strip is wound into a tight core and subjected to a stress relief anneal. The anneal, which usually takes place at a temperature of about 1450° F., fuses the core together.

As an ancillary feature of this invention, it is contemplated that while the primary component of the coating will be silicate glass, it may be desirable to include additives in the coating whereby to increase the bond strength of the core. One such additive material is colloidal silica.

BRIEF DESCRIPTION OF FIGURES

FIG. 1 is a graph showing the relationship of the core resistance in ohms at room temperature after a stress relief anneal (SRA) at 1450° F., to varying compositions of potassium silicate and sodium silicate. Superimposed upon the graph is the effect of bond strength with the changing silicate composition.

FIG. 2 is a graph showing the effect of the silicate drying temperature on the core bond strength of potassium silicate bonded cores, the exposure time being about 5 seconds.

FIG. 3 is a perspective view of a wound core which has been cut and lapped according to the teachings of this invention.

DETAILED DESCRIPTION OF PREFERRED EMBODIMENT

The silicate bonding agent used in the practice of this invention comprises a mixture of up to 70% by weight sodium silicate ($Na_2O:nSiO_2$), with the balance potassium silicate ($K_2O:nSiO_2$) and additives which may be used to enhance the bonding properties of the silicate. The preceding should not be read as limiting the silicate to a mixture of the two recited materials as the exclusive use of potassium silicate is contemplated. In fact, the preferred silicate bonding agent includes at least 90% by weight potassium silicate. But in any case, the silicate composition selected has been shown to display excellent adherence with the magnetic material. Additions of up to 50% by weight of colloidal silica solutions enhance bonding and increase core resistance.

It was discovered that in the production of wound electrical cores economies were realized through the use of silicate bonding agents. The agents are desirable since their bonding properties are realized during the standard stress relief anneal, rather than by some later operation. By the use of such agents, which have a coefficient of expansion less than steel, the magnetic material of the core is placed in tension which results in an improvement in the magnetic properties.

In the practice of this invention, the following silicate solutions having a silica to oxide ratio by weight have been found effective:

| Silicates | n (broad) | n (preferred) |
|---|---|---|
| $K_2=nSiO_2$ | $SiO_2/K_2O=1.8$ to $3.0$ | $SiO_2/K_2=2.5$ |
| $Na_2O=nSiO_2$ | $SiO_2/Na_2O=2.5$ to $3.5$ | $SiO_2/Na_2O=3.0$ |

Kasil #1 and Du pont #30 sold by Philadelphia Quartz Co. and E. I du Pont de Nemours & Co. respectively, are commercial materials suitable for this invention.

The silicate bonding agent may be easily applied to the strip magnetic material in the form of an aqueous solution by any one of several known ways. For example, dipping, spraying, or roller coating are effective to produce a thin and uniform coating. This coating may be applied directly to the steel, to mill glass coated steel, or upon a phosphate coating previously applied to the steel. Finally, the coating is applied in such a manner that upon drying, a film will result which is from about 0.1 mil to about 0.5 mil thick. The amount of water can be varied over a wide range depending upon the method of applying the solution.

As indicated previously, the preferred silicate of this invention comprises potassium silicate, but may contain sodium silicate up to the eutectic mixture, about 70% sodium silicate. However, it will be clear from FIG. 1 that the core resistance drops with the addition of sodium silicate, at least up to the eutectic mixture, the lowest melting point mixture of the sodium-potassium silicate combination. Actually, the core resistance drops rather sharply as the sodium silicate increases beyond 10%. Accordingly, the preferred composition includes at least 90% by potassium silicate when sodium silicate is the other constituent.

Core resistance can be increased while improving the bond strength by the inclusion of up to 50% by weight of colloidal silicate solution. A commercial material found acceptable for achieving this latter feature is Ludox Solution supplied by E. I. du Pont de Nemours & Co.

It has also been demonstrated that as the potassium silicate was increased, the bond strength dropped in the manner illustrated in FIG. 1. Edge bonding of the core was found to be an effective method to increase the bond strength. This may be accomplished by dipping the core into the silicate solution and drying at about 600° F. or less prior to the stress relief anneal. Alternatively, bond strength can be increased by winding the core with wet silicate on the surface and then drying the core.

FIG. 2 represents the preferred procedure for effecting an increase in the bond strength of the core. It was discovered that the silicate drying temperature had a direct influence on the core bond strength. Thus, while the drying temperature may go as high as 800° F., it is preferred to dry the coating at a temperature under 300° F. It is clear from the figure that the adherence is measured by the percentage of underlying mill glass which is removed when the bonded windings of a core are separated. While it is still possible to have some adherence between the windings when no mill glass separates from the substrate, in most applications the bond strength of the silicate must be at least as great as that of the mill glass. Accordingly, it is preferably to dry the coating at a temperature of 600° F., or less, and even at about 200° F. if the strip speed and length of the drying furnace permit.

With the preceding considerations in mind, it may be helpful to set forth some examples of the invention. However, it should be understood that they are merely illustrative, and are not intended as a limitation on the invention.

Example I.—A coil of 6-mil oriented silicon-iron was slit to $1\frac{3}{16}$ inches width for winding into cores. The material was wound into cores having a window size of $\frac{3}{4}$ inch x $2\frac{1}{2}$ inches and a build-up of $\frac{3}{8}$ inch.

Before winding, the slit steel was coated with a solution of potassium silicate and water in equal amounts and dried at 300° F. The wound core was stress relieved at 1450° F. for two hours in a protective atmosphere. After the stress relief anneal the core was cut and lapped in the manner shown in FIG. 3. There were no splits and the magnetic properties were as follows:

| Silicon-iron strip condition | Thickness of silicon-iron slit (mils) | Core loss, 15 kg. at 400 cy. (watts per lb.) | Permeability, magnetizing force of 10 oersteds |
|---|---|---|---|
| Before coating | 5.80 | 6.6 | 1,807 |
| As bonded core | 5.80 | 6.5 | 1,815 |

These results show that the core loss was not appreciably changed by winding of the strip into a core and stress relieving same. A poor bond would have been indicated if splits had occured between the contiguous windings. The permeability values have been included to indicate the material is a highly oriented silicon-iron, and that no adverse effects resulted.

Example II.—Another slit from the same coil as that used in Example I was coated with a mixture of 90% potassium silicate and 10% sodium silicate in a water solution in the proportions given above. The core was annealed, cut and lapped without splits as before. Its properties were as follows:

Silicon-iron strip condition _____ As bonded core.
Thickness of silicon-iron slit (mils) ___ 5.80.
Core loss, 15 kg. at 400 cy. (watts per lb.) _____ 6.6.
Permeability, magnetizing force of 10 oersteds _____ 1805.

It is clear that the 90–10 mixture of the silicates was also very effective in bonding the core.

Example III.—A slit from another heat of 6-mil oriented silicon-iron was wound in to cores in the same manner as that described in the previous examples. However, the strip was coated with a solution of potassium silicate and water in a proportion of 2 to 1. Drying was effected at 250° F. A core was made and stress relieved at 1500° F. After cutting and lapping, the core was tested and compared with the properties of the strip before coating. Here again, no slits were observed in the cut core. Magnetically, the following results were obtained:

| Silicon-iron strip condition | Thickness of silicon-iron slit (mils) | Core loss, 15 kg. at 400 cy. (watts per lb.) | Permeability, magnetizing force of 10 oersteds |
|---|---|---|---|
| Before coating | 5.85 | 6.0 | 1,840 |
| As bonded core | 5.85 | 5.9 | 1,830 |

Again, the silicate coating caused no deterioration in the magnetic properties, and prevented splitting.

Example IV.—A slit from the same coil as that used in Example III was coated with a mixture of 1 part potassium silicate, 1 part colloidal silica [Du Pont Ludox] and 1 part water. The coating was dried at 200° F. A core was wound and stress relieved at 1450° F. It was cut and lapped without splits. Magnetic properties of the bonded, cut and lapped core were as follows:

Silicon-iron strip condition _____ As bonded core.
Thickness of silicon-iron slit (mils) ___ 5.85.
Core loss, 15 kg. at 400 cy. (watts per lb.) _____ 6.4.
Permeability, magnetizing force of 10 oersteds _____ 1800.

Although the colloidal silica addition appears to have a slightly adverse effect upon the core loss, it has been found that the addition improves the bonding strength of the core to the extent that it lessens the sensitivity of the core to splitting under various cutting and lapping procedures.

Having described this invention in its more preferred embodiment, and recognizing that this description may lead others in the art to suggest modifications thereto, no limitation is intended to be imposed herein except as set forth in the appended claims.

I claim:
1. The method of bonding wound electrical core laminations from a strip of ferrous magnetic material comprising the steps of coating said material with an aqueous solution consisting essentially of potassium silicate and up to about 70% sodium silicate, drying said solution in situ at a first temperature up to about 800° F., without additional heating thereof winding said strip into a core whereby portions of said strip lie contiguous with other portions thereof, and heating said core to a temperature substantially higher than said first temperature to stress relieve said core and to bond said contiguous portions of the core.

2. The method claimed in claim 1 wherein said dried coating contains at least 90% by weight of potassium silicate.

3. The method claimed in claim 2 wherein said dried coating is potassium silicate.

4. The method claimed in claim 1 wherein said coating is dried at a temperature not exceeding 300° F.

5. The method claimed in claim 1 wherein said coating contains up to about 50% by weight of colloidal silica solution.

6. The method claimed in claim 1 including the step of coating the edges of said wound core with said aqueous solution and drying at a temperature of about 600° F. or less just prior to said final stress relieving operation.

References Cited
UNITED STATES PATENTS 2,561,462 7/1951 Compton et al. ____ 29—605X
3,418,710 12/1968 Seidel et al. _____ 29—605X JOHN F. CAMPBELL, Primary Examiner C. E. HALL, Assistant Examiner U.S. Cl. X.R.

29—609; 117—112; 336—219, 234